US005523649A

United States Patent [19]

Tong et al.

[11] Patent Number: 5,523,649

[45] Date of Patent: Jun. 4, 1996

[54] MULTILAYER ANTIREFLECTIVE COATING FOR VIDEO DISPLAY PANEL

[75] Inventors: Hua-Sou Tong, Arlington Heights, Ill.; Chun-Min Hu, Keelung, Taiwan

[73] Assignee: Chunghwa Picture Tubes, Ltd., Yangmei, Taiwan

[21] Appl. No.: 335,640

[22] Filed: Nov. 8, 1994

[51] Int. Cl.$^{6}$ .............................. H01J 29/28; G02B 1/11

[52] U.S. Cl. .......................... 313/479; 313/112; 313/478; 427/162; 427/164; 359/601; 359/609

[58] Field of Search .................................... 313/478, 479, 313/112; 427/162, 164; 359/586, 587, 588, 601, 609, 614

[56] References Cited

U.S. PATENT DOCUMENTS 4,830,879 5/1989 Debsikdar .............................. 427/162
5,254,904 10/1993 Van De Leest et al. ............... 313/478

*Primary Examiner*—Nimeshkumar D. Patel
*Attorney, Agent, or Firm*—Emrich & Dithmar

[57] ABSTRACT

A multilayer antireflective coating is applied to the outer surface of a video display panel such as a cathode ray tube (CRT) or a flat panel display in the form of successive thin layers each having a different light refractive index, where the light refractive index of each layer decreases in the direction away from the surface of the display panel and toward the outer layer of the coating. Each layer is formed from the same starting gel materials, with the degree of crosslinking of each gel layer varied to provide the desired light refractive index for reducing reflections from the display panel's outer surface over a wide spectrum. The extent of crosslinking and thus the individual layer's light refractive index is varied by controlling the aging of the gel, with longer aging providing increased crosslinking and larger molecular weight for a lower light refractive index. For example, silica gels aged over different time periods provide gels having a light refractive index ranging from 1.45 (shorter aging) to 1.18 (longer aging). An antistatic layer may be applied directly to the outer surface of the display panel before the antireflective coating is applied by adding an electrically conductive fine powder such as of tin oxide, antimony-doped tin oxide, etc. The high light refractive index of these conductive coatings, i.e., n>1.8, further improves the antireflective characteristics of the multilayer coating.

5 Claims, 1 Drawing Sheet

MULTILAYER ANTIREFLECTIVE COATING FOR VIDEO DISPLAY PANEL

FIELD OF THE INVENTION

This invention relates generally to antireflective coatings for use on the outer surface of a video display panel and is particularly directed to a multilayer antireflective coating for a video display panel where each layer has a different light refractive index to reduce light reflection from the panel over a wide spectrum.

BACKGROUND OF THE INVENTION

Display panels such as of a cathode ray tube (CRT) or a flat panel display provide a video image for viewing. The display panel is generally comprised of glass and may include one or more layers of an antireflective coating on its outer surface for reducing light reflections which degrade the video image. Each layer is typically one-quarter (¼) of the wavelength of the light to be suppressed in reflection. A common antireflective coating is comprised of a gel material, such as silica gel, and may include dopants, where the degree of crosslinking of the gel material determines the density of the material and hence its light refractive index. Increased crosslinking affords a lower light refractive index.

U.S. Pat. No. 5,254,904 discloses an arrangement employing a plurality of antireflective coating layers such as for a CRT having a light refractive index gradient such that the refractive index decreases in the direction from the display panel surface to the outer layer of the coating. The change in light refractive index between adjacent layers having the same starting composition is effected by varying the temperature, acidity and degree of hydrolysis of the starting material. This approach is overly complicated, requiring precise control of the composition of the coating, and is thus impractical for large scale manufacturing of consumer-type video display panels.

The present invention addresses the aforementioned limitations of the prior art by providing an economical method which is easily implemented and controlled using a common starting material for providing an antireflective coating having a precisely controlled light refractive index for use on a video display panel.

OBJECTS AND SUMMARY OF THE INVENTION

Accordingly, it is an object of the present invention to provide an improved video image as viewed on a display panel such as a CRT or flat panel display by reducing light reflection from the panel.

It is another object of the present invention to provide a multilayer antireflective coating for a video display panel wherein the light refractive index decreases for each layer in the direction from the display panel's surface toward the outer layer of the coating.

Yet another object of the present invention is to provide an economical multilayer antireflective coating for a video display panel using readily available, known materials, wherein each layer has the same starting composition.

A further object of the present invention is to provide a gel coating having a selected light refractive index which may be established over a wide range of values by the manner in which the gel coating is processed.

A still further object of the present invention is to fix the extent of crosslinking in a gel, and thus the gel's light refractive index, by controlling the aging of the gel.

This invention contemplates an antireflective coating on a substrate comprised of a plurality of discrete layers of a gel material having an index of refraction decreasing from an innermost layer in contact with the substrate to an outermost layer of the antireflective coating, wherein each of the layers is characterized by an aging period beginning with mixing of components of the gel material and ending with application of the layer to the substrate or to a next inner layer of the gel material, and wherein a degree of crosslinking in each of the layers of the gel material increases with the aging period of the layer.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
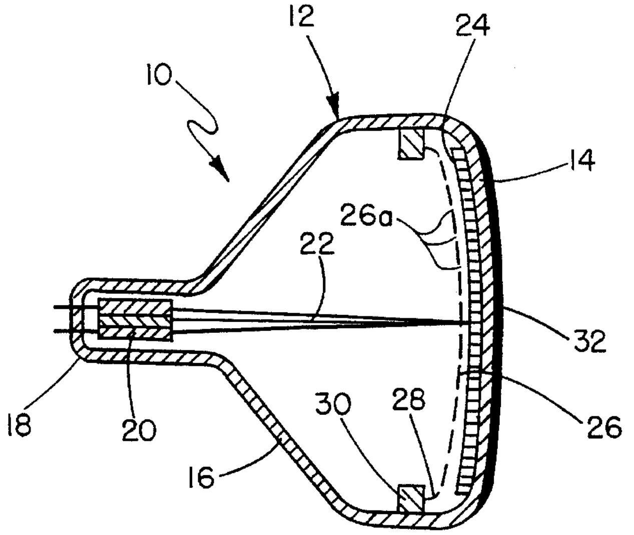
FIG. 1 is a longitudinal sectional view of a CRT incorporating a multilayer antireflective coating in accordance with the principles of the present invention.

Referring to FIG. 1, there is shown a sectional view of a color CRT 10 incorporating a multi-layer antireflective coating 32 in accordance with the principles of the present invention. CRT 10 includes a sealed glass envelope 12 having a forward faceplate or display screen 14, an aft neck portion 18, and an intermediate funnel portion 16. Disposed on the inner surface of glass faceplate 14 is a phosphor screen 24 which includes a plurality of discrete phosphor deposits, or elements, which emit light when an electron beam is incident thereon to produce a video image on the faceplate. Color CRT 10 includes three electron beams 22 directed onto and focused upon the CRT's glass faceplate 14. Disposed in the neck portion 18 of the CRT's glass envelope 12 are a plurality of electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a space manner from phosphor screen 24 is a shadow mask 26 having a plurality of spaced electron beam passing apertures *26a* and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figure for simplicity. The shadow mask mounting fixture 30 may be attached to the inner surface of the CRT's glass envelope 12 and the shadow mask 26 may be attached to the mounting fixture by conventional means such as weldments or a glass-based frit.

Figure 2:
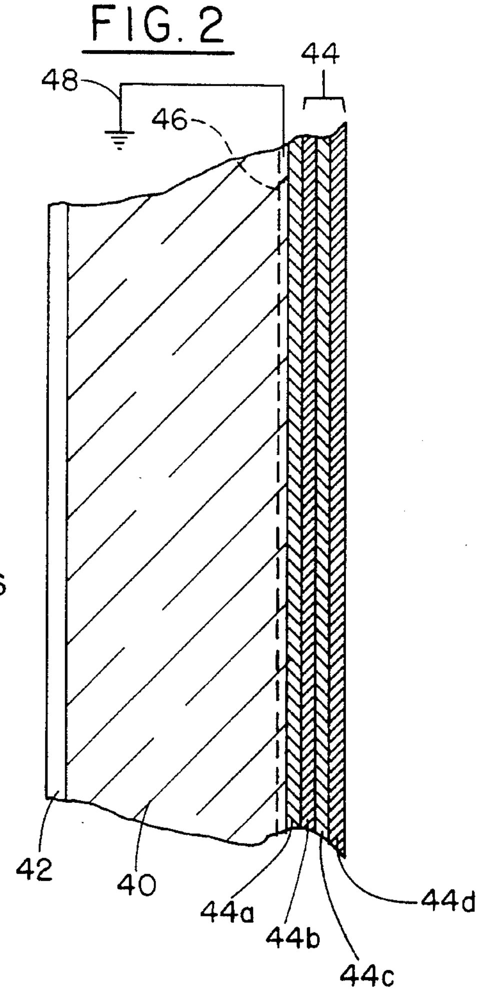
FIG. 2 is a sectional view of a portion of a flat panel display having a multilayer antireflective coating in accordance with the present invention on the outer surface thereof.

A sectional view of a multi-layer antireflective coating 44 in accordance with the present invention disposed on the outer surface of a flat display panel 40 is shown in FIG. 2. The flat display panel 44 is comprised of glass and has a phosphor layer 42 disposed on its inner surface for emitting light of the three primary colors of red, green, and blue in response to electron beams incident thereon. The antireflective coating 44 includes a first inner layer 44*a*, a second layer 44*b*, a third layer 44*c*, and a fourth layer 44*d*. Suitable gel materials for use in antireflective coating layers include water soluble gel materials including alkoxides, such as methoxy and ethoxy compounds of silicon, titanium and aluminum as the starting material having the general composition $M(OR)_x$ type, where M is a metal atom such as Si, Al, Ti, where R is an alkyl group having 1 to 5 carbon atoms, and where x is the valency of the metal atom. In the disclosed embodiment, each of the layers is comprised of silica gel having the general composition of tetra epoxy silane (TES), water and an acid, such as hydrochloric acid (HCl). TES has the composition Si—O—Si.

In accordance with one aspect of the present invention, each of the antireflective layers 44*a*–44*d* has a thickness on the order of ¼λ, where λ is the wavelength of the light, the reflections of which are to be suppressed. Thus, for yellow-green light having a wavelength on the order of 550 nm, the thickness of an antireflective layer for suppressing reflections at this wavelength is on the order of 550/4 or 137.5 nm. This thickness of the antireflective layer complies with the ¼ wavelength antireflective mode criteria. Each of the first through fourth layers 44*a*–44*d* is successively applied to the outer surface of the display panel 40 by conventional means such as chemical vapor deposition (CVD) or physical vapor deposition (PVD) as described below. While the present invention is described as including four (4) antireflective layers, this invention is not limited to this specific number and may include virtually any numbers of antireflective coating layers.

In accordance with the present invention, it has been ascertained that the light refractive index n of each of the layers 44*a*–44*d* of the multilayer antireflective coating 44 may be precisely controlled by the "aging" of the layer. By "aging" is meant the period beginning with preparation of the layer from the aforementioned TES, water and acid mixture and ending with application of the mixture to the outer surface of the glass display panel in the form of a thin layer. By varying the aging of the antireflective coating layer between on the order of one week to two weeks, the light refractive index of the antireflective coating layer may be varied between the values of 1.5 (shorter aging) to 1.00 (longer aging), where 1.5 is the light refractive index of glass and 1.0 is the light refractive index of air. During the aging process, the TES, water and acid mixture is held in a container such as a beaker for temporary storage prior to its application to the outer surface of the display panel in the form of a thin layer.

Also in accordance with one embodiment of the present invention, the light refractive index of each of the layers 44*a*–44*d* decreases in proceeding from the innermost layer to the outermost layer. Thus, in the disclosed embodiment, the first innermost layer 44*a* has a light refractive index on the order of 1.45, while the outermost layer 44*d* has a light refractive index on the order of 1.18, with the intermediate layers 44*b* and 44*c* having deceasing light refractive index values between 1.45 and 1.18 in proceeding outward from the display panel 40. Another embodiment contemplates an arrangement having alternatively high and low light refractive index values. In this embodiment, the innermost layer 44*a* has a light refractive index in the range 1.8–2.2, while layer 44*b* has a light refractive index in the range 1.2–1.4. Layer 44*c* has a light refractive index higher than that of layer 44*b*, while the outermost layer 44*d* has a lower light refractive index than that of layer 44*c*.

An antistatic capability may be incorporated in the multilayer antireflective coating 44 by adding a conductive layer 46 (shown in the dotted fine form) to the display panel 40 prior to application of the innermost layer 44*a*. By first applying a conductive layer 46 such as tin oxide, tantalum oxide, titanium oxide, or antimony-doped or arsenic-doped tin oxide to the display panel 40, antistatic protection is provided for the 15 display panel 40. Because of the high light refractive index of these conductive coatings ($n>1.8$), the overall antireflective effect is further improved. As shown in FIG. 2, the conductive layer 46 is coupled to neutral ground potential by means of a conductor 48.

Figure 3:
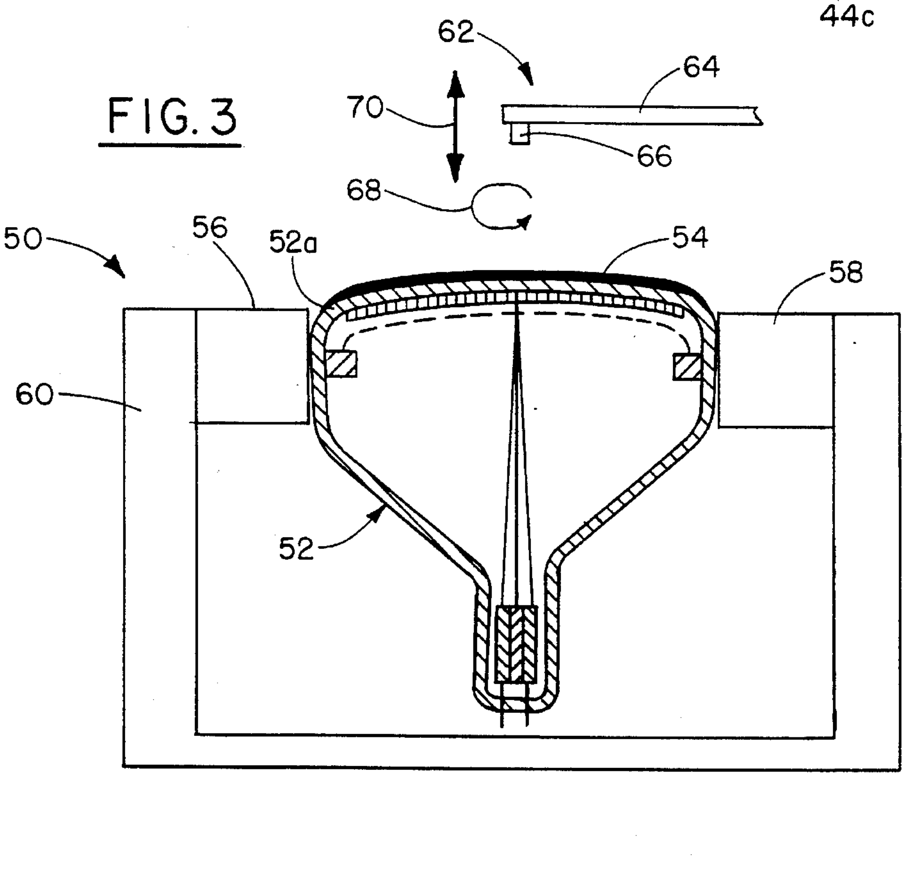
FIG. 3 is simplified schematic view illustrating the manner in which the outer surface of a video display panel may be provided with a multilayer antireflective coating in accordance with the present invention.

Referring to FIG. 3, there is shown in simplified schematic diagram form an antireflective coating application apparatus 50 for applying a multilayer antireflective coating 54 to the glass display panel 52*a* of a CRT 52. The coating application apparatus 50 includes a plurality of support blocks, two of which are shown as elements 56 and 58 for engaging and supporting CRT 52. A spray apparatus 62 including a spray nozzle 66 and support arm 64 is disposed above the CRT 52. Spray apparatus 62 directs the gel material forming the antireflective layers onto the CRT's glass display screen 52*a* in the form of a fine mist. Spray apparatus 62 is capable of being raised or lowered in the direction of arrow 70 for applying layers of uniform thickness, while the coating application apparatus 50 is adapted for rotationally displacing CRT 52 in the direction of arrow 68 at a speed of 150–250 rpm. Typically, 20 ml is applied to the CRT's display screen 52*a* for each layer of the antireflective coating.

There has thus been shown a multilayer antireflective coating disposed on the outer surface of a video display panel which substantially reduces light reflection therefrom. Each layer of the antireflective coating is provided with a selected light refractive index value, where in one embodiment the light reflective index decreases in proceeding from the CRT's glass display panel to the outermost layer, while in another embodiment the light refractive indices alternate between high and low values between adjacent layers. Each layer is formed from the same gel materials with the degree of crosslinking and thus the light refractive index of each gel layer varied by controlling the aging of the gel, with longer aging providing increased crosslinking and larger molecular weights resulting in a lower light refractive index. The aging period extends from the initial mixing of the gel components to application of the gel material in the form of a thin layer to the CRT's display screen. In another embodiment, an antistatic layer may be applied directly to the display panel prior to application of the first, or innermost, antireflective layer to provide antistatic protection.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An antireflective coating on a substrate comprised of a plurality of discrete layers of a gel material consisting of silica gel and having an index of refraction decreasing from an innermost layer in contact with said substrate to an outermost layer of said antireflective coating, wherein each of said layers is characterized by an aging period beginning with mixing of components of said gel material and ending with application of said layer to said substrate or to a next inner layer of said gel material, and wherein a degree of chemical reaction crosslinking in each of said layers of said gel material increases with the aging period of the layer and the index of refraction of each of said layers decreases with increased aging of the layer, and wherein the aging period of each layer is from one week to two weeks and increases in proceeding from the innermost to the outermost layer.

2. The antireflective coating of claim 1 wherein the degree of crosslinking of each layer of the gel material is characterized by an associated light refractive index, and wherein the light refractive index of said layers ranges from approximately 1.45 for said innermost layer to approximately 1.18 for said outermost layer.

3. The antireflective coating of claim 1 further comprising an antistatic layer applied directly to said substrate and beneath said innermost layer to provide said antireflective coating with an antistatic characteristic for grounding an electrostatic charge on said substrate.

4. The antireflective coating of claim 3 wherein said antistatic layer includes tin oxide, tantalum oxide or titanium oxide.

5. The antireflective coating of claim 4 wherein said tin oxide is antimony-doped or arsenic-doped.

* * * * *